Figure 7:
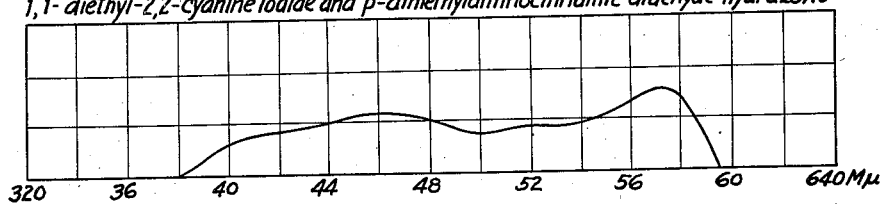

July 8, 1947.   E. B. KNOTT   2,423,710
SENSITIZED PHOTOGRAPHIC EMULSION
Filed April 12, 1945   3 Sheets-Sheet 1
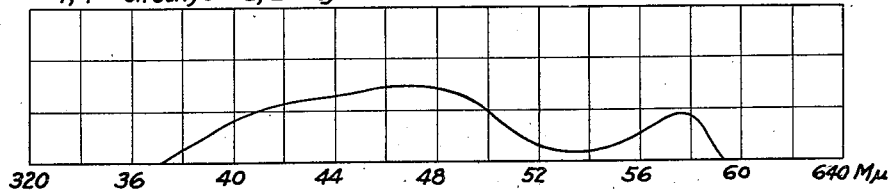
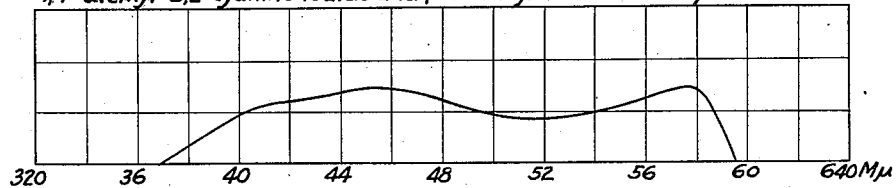
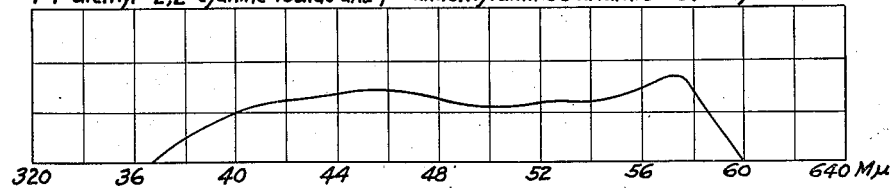
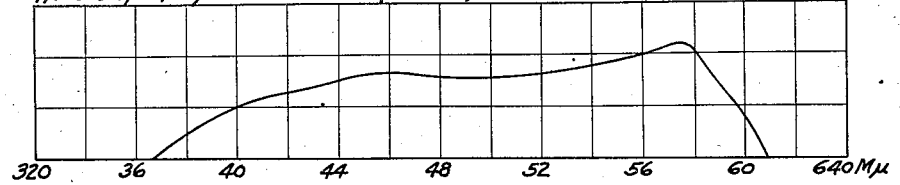
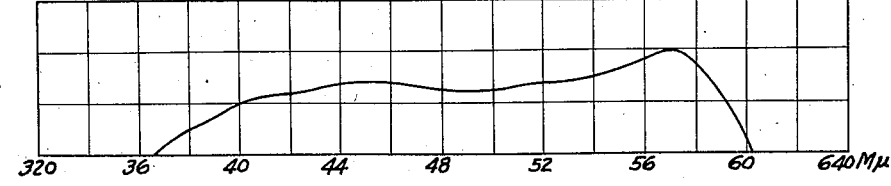
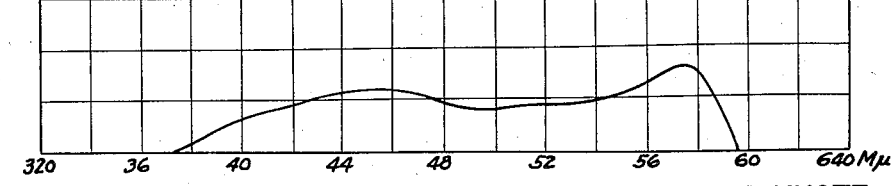
EDWARD B. KNOTT
INVENTOR July 8, 1947.　　　　E. B. KNOTT　　　2,423,710
SENSITIZED PHOTOGRAPHIC EMULSION
Filed April 12, 1945　　　3 Sheets-Sheet 2

EDWARD B. KNOTT
INVENTOR
BY
ATTORNEYS

July 8, 1947.  E. B. KNOTT  2,423,710
SENSITIZED PHOTOGRAPHIC EMULSION
Filed April 12, 1945  3 Sheets-Sheet 3

EDWARD B. KNOTT
INVENTOR

BY N. M. Perrins
Daniel J. Mayne
ATTORNEYS

UNITED STATES PATENT OFFICE 2,423,710

SENSITIZED PHOTOGRAPHIC EMULSION

Edward B. Knott, Wealdstone, England, assignor to Eastman Kodak Company, Rochester, N. Y., a corporation of New Jersey Application April 12, 1945, Serial No. 587,917
In Great Britain May 18, 1944

18 Claims. (Cl. 95—7)

This invention relates to sensitized photographic emulsions and more particularly to spectrally (optically) sensitized emulsions.

It is known that the distribution of spectral sensitivity of certain spectrally sensitized (i. e. dye-sensitized) emulsions can be altered and an increase in sensitivity obtained in some spectral region, by incorporating certain additional sensitizing dyes in the spectrally sensitized emulsions. (See United States Patents 2,158,882, dated May 16, 1939, and 2,159,565, dated May 23, 1939.) The effect thus obtained has come to be known as supersensitization. Supersensitization of certain spectrally sensitized emulsions can also be effected by incorporating certain substantially colorless heterocyclic bases, viz. those containing an amino group, in the spectrally sensitized emulsions. (See United States Patent 2,177,635, dated October 31, 1939.) Supersensitization differs from hypersensitization which involves bathing of finished plates or films, an operation which normally reduces the pAg and increases the pH of the emulsions with consequent decreased stability.

I have now found a new method for supersensitizing spectrally sensitized emulsions, which not only does not reduce the stability of the emulsions, but is valuable as a means of securing spectrally sensitized emulsions of increased speed.

It is, accordingly, an object of my invention to provide new supersensitized photographic emulsions. A further object is to provide a process for preparing such emulsions. Still other objects will become apparent hereinafter.

In accordance with my invention, a photographic silver halide emulsion spectrally sensitized with a 2'-cyanine dye or an oxacarbocyanine dye is supersensitized by incorporating in the emulsion at least one organic compound selected from those represented by the following general formula:

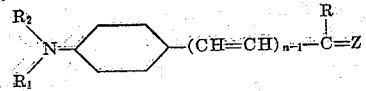

wherein $R_1$ and $R_2$ each represents an alkyl group, $n$ represents a positive integer of from 1 to 6, R represents a member selected from the group consisting of hydrogen, an alkyl group, an aralkyl group, an aryl group and a group of the following general formula:

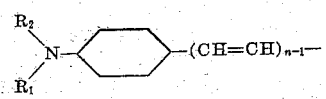

wherein $R_1$ and $R_2$ and $n$ have the values given above, Z represents a member selected from the group consisting of a hydrazono group, an alkylhydrazono group, a dialkylhydrazono group, an aralkylhydrazono group, a diaralkylhydrazono group, an arylhydrazono group, a diarylhydrazono group, a hydroximino group, a carbamylhydrazono group, a thiocarbamylhydrazono group and a guanylhydrazono group when $n$ represents a positive integer of from 1 to 6, and when $n$ represents a positive integer of from 2 to 6, Z represents an oxygen atom in addition to the groups recited above for Z.

The compounds which I incorporate in the spectrally sensitized emulsion include hydrazones, semicarbazones, thiosemicarbazones, oximes and aminoguanides, as well as the corresponding carbonyl compounds in some cases.

Typical examples of these compounds include:

p-Dialkylaminocinnamic aldehydes
p-Dialkylaminobenzal acetones
p-Dialkylaminobenzal acetophenones
p-Dialkylaminocinnamal acetophenones
p-Dialkylaminocinnamic aldehyde phenyl hydrazones
p-Dialkylaminocinnamic aldehyde hydrazones
p-Dialkylaminocinnamic aldehyde semicarbazones
p-Dialkylaminocinnamic aldehyde guanides
p-Dialkylbenzal acetone semicarbazones
Bis (p-dialkylaminobenzal acetones)
p-Dialkylaminocinnamic aldehyde oximes The sensitizing dyes which I employ in practicing my invention fall within the class of 2'-cyanine dyes and the class of oxacarbocyanine dyes. The supersensitizing effects obtained with the 2'-cyanine dyes (especially the 1,1'-dialkyl-2,2'-cyanine salts) are much more marked than the effects which can be obtained with the oxacarbocyanine dyes. By the term 2'-cyanine dye, I mean a monomethinecyanine dye containing a quinoline nucleus linked through its α- or 2-position to another heterocyclic nucleus through the α- or 2-position of the second heterocyclic nucleus. By the term oxacarbocyanine dyes, I mean a carbocyanine dye containing two benzoxazole nuclei. Among the 2'-cyanine dyes and oxacarbocyanine dyes which I employ in practicing my invention are the following:

1,1'-dialkyl-2,2'-cyanine salts; e. g. 1,1'-diethyl-2,2'-cyanine halides, such as the iodide.
3,1'-dialkylbenzothia-2'-cyanine salts, e. g. 3-methyl-1'-ethylbenzothia-2'-cyanine halides, such as the bromide.

3,1'-dialkylthia-2'-cyanine salts, e. g. 3-methyl-1'-ethylthia-2'-cyanine halides, such as the iodide.

3,1'-dialkylselena-2'-cyanine salts, e. g. 3,1'-diethylselena-2'-cyanine halides, such as the iodide.

3,3'-dialkyloxacarbocyanine salts, e. g. 3,3'-diethyl or 3,3',9-triethyloxacarbocyanine halides, such as the iodide.

The sensitizing dyes can be employed in any desired concentration. Ordinarily from 10 to 30 mg. of dye per liter of emulsion (containing about 0.25 gram-moles of silver halide) will suffice to produce the optimum sensitizing effect. The methods of incorporating sensitizing dyes in emulsions are well known to those skilled in the art. Ordinarily, it is preferable to dissolve the dye in a water-miscible solvent, such as methanol, and incorporating the methyl alcoholic solution in the emulsion. Ethyl alcohol or acetone may be employed instead of methanol. One or more sensitizing dyes can be employed.

Ordinarily, the supersensitizing compound is incorporated in the emulsion which already contains the sensitizing dye or dyes. However, the supersensitizing compound can be incorporated in the emulsion before the sensitizing dye or dyes, or the supersensitizing compound and the sensitizing dye or dyes can be incorporated in the emulsion simultaneously. Usually the supersensitizing compounds are incorporated in the emulsion in a concentration equal to from about 10 to about 300 mg. for that quantity of silver halide emulsion equivalent to 200 grams of silver nitrate. The optimum concentration for process-type emulsions is usually of the order of 100 mg. for that quantity of silver halide emulsion equivalent to 200 grams of silver nitrate. The supersensitizing compounds are preferably but not necessarily dissolved in a water-miscible solvent, such as methanol before incorporation in the emulsion. One or more of the supersensitizing compounds can be employed and the supersensitizing compounds as well as the sensitizing dyes can be added to the emulsion during any suitable stage of its preparation. Usually both the supersensitizing compounds and the supersensitizing dyes are advantageously added to the washed, finished emulsions.

To determine the optimum concentration of any of the supersensitizing compounds, a batch of emulsion is first sensitized with the sensitizing dye in such quantity as to give optimum speed. Another batch of the same emulsion is similarly sensitized and several portions of this batch of emulsion are treated with various concentrations of the supersensitizing compound. Each of the portions of emulsion is then coated and exposed and processed as usual. The increase in the minus blue speed of the emulsion at optimum supersensitizer concentration is taken as a measure of the supersensitizing action of the compound. Wedge spectrograms also indicate this measure.

The accompanying drawings show diagrammatically the spectrograms of emulsions containing sensitizing dyes with and without the supersensitizing compounds of the present invention. The compositions of the emulsions are given in the following examples which are numbered to correspond to the figure numbers in the drawings.

*Example 1*

A gelatino-silver-bromiodide developing-out emulsion was sensitized with 1,1'-diethyl-2,2'-cyanine iodide having the formula:

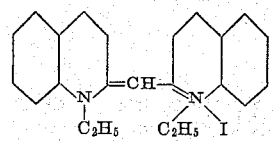

in a concentration of 100 mg. per that quantity of emulsion equivalent to 200 grams of silver nitrate. The sensitizing effect of this quantity of dye is depicted in Fig. 1 of the accompanying drawing.

*Example 2*

To a quantity of a gelatino-silver-bromide developing-out emulsion, dye-sensitized as in Example 1, was added p-dimethylaminobenzaldehyde semicarbazone in a concentration of 100 mg. per that quantity of emulsion equivalent to 200 grams of silver nitrate. The resulting emulsion showed an increase in green sensitivity of 300 per cent over the green sensitivity of the emulsion of Example 1. This increase in sensitivity is apparent from Fig. 2 of the accompanying drawing which depicts the sensitivity of the emulsion of the instant example.

*Example 3*

To a gelatino-silver-bromiodide developing-out emulsion, dye-sensitized as in Example 1, was added p-dimethylaminocinnamic aldehyde in a concentration of 100 mg. per that quantity of emulsion equivalent to 200 grams of silver nitrate. The resulting emulsion showed an increase in green sensitivity of 700 per cent over the green sensitivity of the emulsion of Example 1. This increase in green sensitivity is apparent from Fig. 3 which depicts the sensitivity of the emulsion of the instant example.

*Example 4*

To a gelatino-silver-bromide developing-out emulsion dye-sensitized as in Example 1 was added p-dimethylaminocinnamic aldehyde semicarbazone in a concentration of 100 mg. per that quantity of emulsion equivalent to 200 grams of silver nitrate. The resulting emulsion showed an increase in green sensitivity of 1500 per cent over the green sensitivity of the emulsion of Example 1. This increase in green sensitivity is apparent from Fig. 4 of the accompanying drawing which depicts the sensitivity of the instant emulsion.

*Example 5*

To a gelatino-silver-bromide developing-out emulsion, dye-sensitized as in Example 1, was added p-dimethylaminocinnamic aldehyde aminoguanide in a concentration of 100 mg. per that quantity of emulsion equivalent to 200 grams of silver nitrate. The resulting emulsion showed an increase in green sensitivity of 700 per cent over the green sensitivity of the emulsion of Example 1. This increase in green sensitivity is apparent from Fig. 5 of the accompanying drawing which depicts the sensitivity of the instant emulsion.

*Example 6*

To a gelatino-silver-bromiodide developing-out emulsion, dye-sensitized as in Example 1, was added p-dimethylaminocinnamic aldehyde phenylhydrazone in a concentration of 100 mg. per that quantity of emulsion equivalent to 200 grams of silver nitrate. The resulting emulsion showed an increase in green sensitivity of 300 per cent over the green sensitivity of the emulsion of Example 1. This increase in green sensitivity is apparent from Fig. 6 of the accompanying drawing which depicts the sensitivity of the instant emulsion.

Example 7

To a gelatino-silver-bromiodide developing-out emulsion, dye-sensitized as in Example 1, was added p-dimethylaminocinnamic aldehyde hydrazone in a concentration of 100 mg. per that quantity of emulsion equivalent to 200 grams of silver nitrate. The resulting emulsion showed an increase in green sensitivity of 300 per cent over the green sensitivity of the emulsion of Example 1. This increase in green sensitivity is apparent from Fig. 7 of the accompanying drawing which depicts the sensitivity of the instant emulsion.

Using the below-listed compounds instead of p-dimethylaminocinnamic aldehyde hydrazone, at the same concentration, various increases in the minus blue speed of the emulsion of Example 1 were obtained as indicated:

| | Minus blue speed increase, per cent |
|---|---|
| p-Dimethylaminobenzalacetophenone | 700 |
| p-Dimethylaminocinnamalacetophenone | 1000 |
| p-Dimethylaminobenzalacetone | 300 |
| p-Dimethylaminobenzalacetone semicarbazone | 700 |
| p-Dimethylaminocinnamalacetone | 700 |
| Bis-(p-dimethylaminobenzal) acetone | 500 |

Example 8

Figure 8:
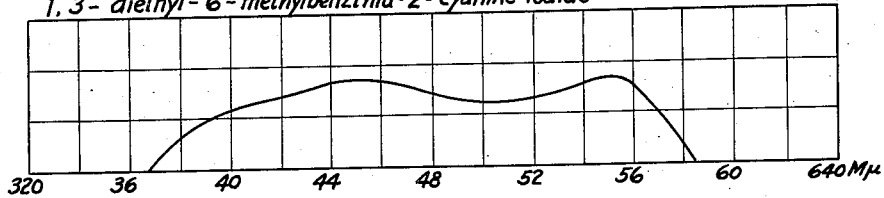

A gelatino-silver-bromiodide developing-out emulsion was sensitized with 1',3-diethyl-6'-methyl-4,5-benzthia-2'-cyanine iodide having the formula:

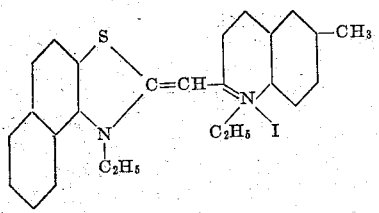

in a concentration equal to 100 mg. of the cyanine iodide per that quantity of emulsion equivalent to 200 grams of silver nitrate. The sensitizing effect of this quantity of dye is depicted in Fig. 8 of the accompanying drawing.

Example 9

Figure 9:
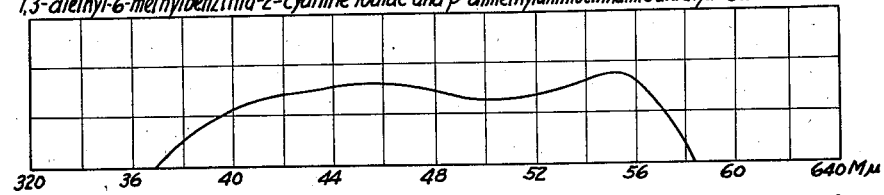

To a gelatino-silver-bromiodide developing-out emulsion, dye-sensitized as in Example 8, was added p-dimethlylaminocinnamic aldehyde semicarbazone in a concentration of 100 mg. per that quantity of emulsion equivalent to 200 grams of silver nitrate. The resulting emulsion showed an increase in green sensitivity of 30 per cent over the green sensitivity of the emulsion of Example 1. This increase in green sensitivity is apparent from Fig. 9 of the accompanying drawing which depicts the sensitivity of the instant emulsion.

Example 10

Figure 10:
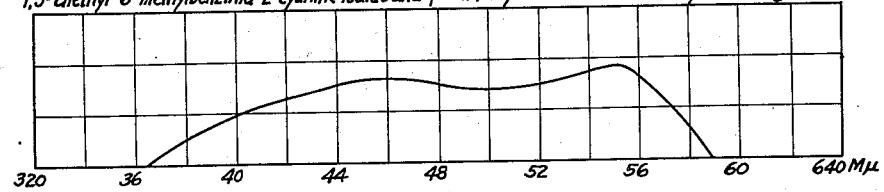

To a gelatino-silver-bromiodide developing-out emulsion, dye-sensitized as in Example 8, was added p-dimethylaminocinnamic aldehyde amino-guanide in a concentration of 100 mg. per that quantity of emulsion equivalent to 200 grams of silver nitrate. The resulting emulsion showed an increase in green sensitivity of 30 per cent over the green sensitivity of the emulsion of Example 1. This increase in green sensitivity is apparent from Fig. 10 of the accompanying drawing which depicts the sensitivity of the instant emulsion.

Example 11

Figure 11:
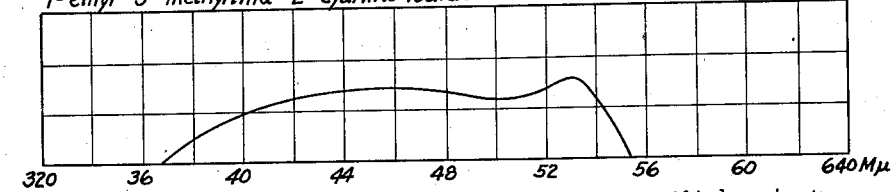

A gelatino-silver - bromiodide developing-out emulsion was sensitized with 1-ethyl-3-methylthio-2'-cyanine iodide having the formula:

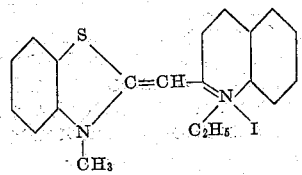

in a concentration equal to 100 mg. of the cyanine iodide per that quantity of emulsion equivalent to 200 grams of silver nitrate. The sensitizing effect of this quantity of dye is depicted in Fig. 11 of the accompanying drawing.

Example 12

Figure 12:
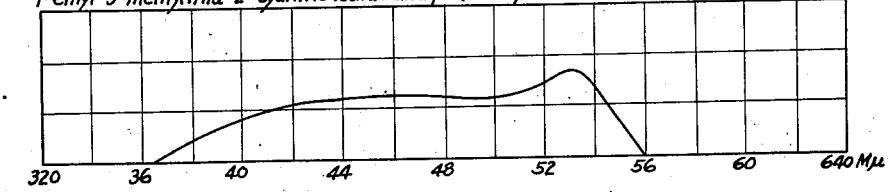

To a gelatino-silver-bromiodide developing-out emulsion, dye-sensitized as in Example 11, was added p-dimethylaminocinnamic semicarbazone in a concentration of 100 mg. per that quantity of emulsion equivalent to 200 mg. of silver nitrate. The resulting emulsion showed an increase in green sensitivity of 150 per cent over the green sensitivity of the emulsion of Example 11. This increase in green sensitivity is apparent from Fig. 12 of the accompanying drawing which depicts the sensitivity of the instant emulsion.

Example 13

Figure 13:
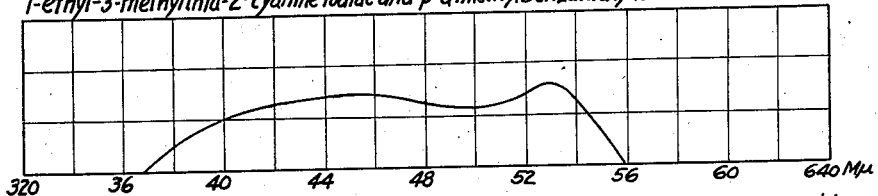
Figure 14:
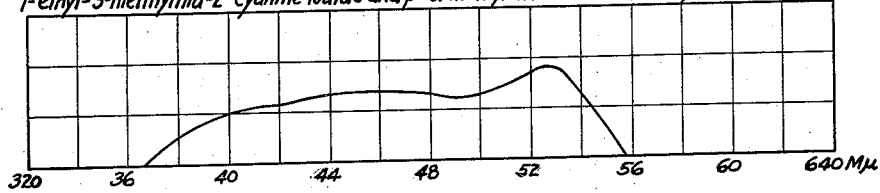

To a gelatino-silver-bromiodide developing-out emulsion, dye-sensitized as in Example 11, was added p-dimethylamino-benzaldehyde semicarbazone in a concentration of 100 mg. per that quantity of emulsion equivalent to 200 mg. of silver nitrite. The resulting emulsion showed an increase in green sensitivity of 30 per cent over the green sensitivity of the emulsion of Example 11. This increase in green sensitivity can be seen from Fig. 13 of the accompanying drawing which depicts the sensitivity of the instant emulsion.

Example 14

To a gelatino-silver-bromiodide developing-out emulsion, dye-sensitized as in Example 11, was added p-dimethylaminocinnamic aldehyde aminoguanide in a concentration of 100 mg. per that quantity of emulsion equivalent to 200 mg. of silver nitrate. The resulting emulsion showed an increase in green sensitivity of 100 per cent over the green sensitivity of the emulsion of Example 11. This increase in green sensitivity can be seen from Fig. 13 of the accompanying drawing which depicts the sensitivity of the instant emulsion.

Example 15

A gelatino-silver-bromiodide developing-out emulsion was sensitized with 3,3'-diethyloxacarbocyanine iodide having the formula

Figure 15:
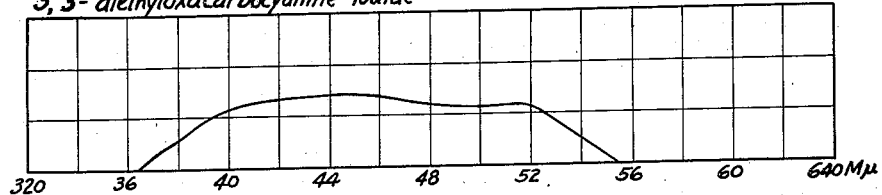

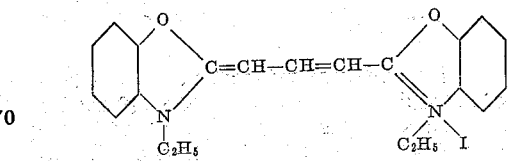

in a concentration equal to 100 mg. of the carbocyanine iodide per that quantity of emulsion equivalent to 200 grams of silver nitrate. The sensitizing effect of this quantity of dye is depicted in Fig. 15 of the accompanying drawing.

*Example 16*

Figure 16:
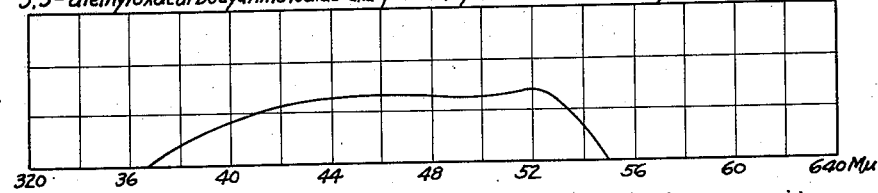
Figure 17:
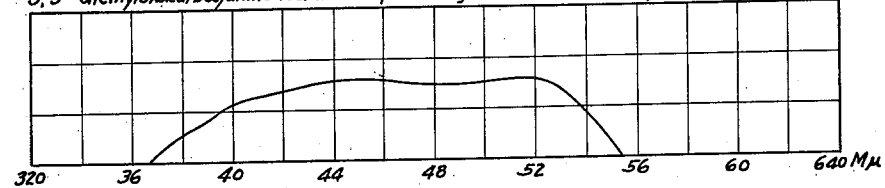

To a gelatino-silver-bromiodide developing-out emulsion, dye-sensitized as in Example 15, was added p-dimethylaminocinnamic aldehyde semicarbazone in a concentration of 100 mg. per that quantity of emulsion equivalent to 200 mg. of silver nitrate. The resulting emulsion showed an increase in green sensitivity of 100 per cent over the green sensitivity of emulsion of Example 15. This increase in green sensitivity is apparent from Fig. 16 of the accompanying drawing which depicts the sensitivity of the instant emulsion.

*Example 17*

To a gelatino-silver-bromiodide developing-out emulsion, dye-sensitized as in Example 15, was added p-dimethylaminocinnamic aldehyde aminoguanide in a concentration of 100 mg. per that quantity of emulsion equivalent to 200 mg. of silver nitrate. The resulting emulsion showed an increase in green sensitivity of 30 per cent over the green sensitivity of emulsion of Example 15. This increase in green sensitivity is apparent from Fig. 16 of the accompanying drawing which depicts the sensitivity of the instant emulsion.

In a manner similar to that illustrated in the foregoing examples other 2'-cyanine dyes and oxacarbocyanine dyes can be supersensitized with one or more of the compounds represented by the foregoing general formula.

My invention is primarily directed to the customarily employed gelatino-silver-halide developing-out emulsion, such as gelatino-silver-chloride, gelatino-silver-chlorobromide, gelatino-silver-bromide and gelatino-silver-bromiodide emulsions.

Emulsions prepared in accordance with my invention can be coated in the usual manner upon any desired support, such as cellulose nitrate film, cellulose acetate film, polyvinyl acetal resin film, metal support, glass support or paper support.

The supersensitizing compounds which I employ in practicing my invention are known or can be readily prepared. The preparations of several compounds are illustrated in the following examples.

*Example 18.—p-Dimethylaminobenzalacetophenones*

7.45 g. of p-dimethylaminobenzaldehyde and 6 g. of acetophenone were dissolved in 40 cc. of ethyl alcohol. To this solution were added 5 cc. of a 10 per cent (by weight) aqueous solution of sodium hydroxide. The resulting mixture was allowed to stand at 25° C. for 4 hours. Then a little water was added until the mixture became cloudy. After a while, white large glistening plates separated out. These were recrystallized from aqueous ethyl alcohol and obtained as yellow needles melting at 110° to 112° C. Similarly other p-dialkylaminobenzalacetophenones can be prepared.

*Example 19.—p-Dimethylaminocinnamalacetophenone*

0.875 g. of p-dimethylaminocinnamic aldehyde, 0.6 g. of acetophenone and 10 cc. of ethyl alcohol were warmed to give a solution. 1 cc. of 10 per cent (by weight) aqueous sodium hydroxide were added to the solution. Upon cooling the resulting mixture, glistening red plates separated out. After 12 hours standing, the red plates were filtered off and recrystallized from ethyl alcohol. Glistening flat red needles were obtained, melting at 154° to 155° C. Similarly other p-dialkylaminocinnamalacetophenones can be prepared.

*Example 20.—p-Dimethylaminobenzalacetone*

7.45 g. of p-dimethylaminobenzaldehyde and 2.9 g. of acetone were dissolved in 50 cc. of ethyl alcohol and 5 cc. of 10 per cent (by weight) of aqueous sodium hydroxide were added. The liquor set after several hours. The material was recrystallized from ethyl alcohol and obtained as yellow needles, melting at 120° to 123° C. Similarly other p-dialkylaminobenzalacetones can be prepared.

*Example 21.—p-Dimethylcinnamalacetone*

0.875 g. of p-dimethylaminocinnamic aldehyde and 0.3 g. of acetone were dissolved in 10 cc. of ethyl alcohol. 1 cc. of 10 per cent (by weight) aqueous sodium hydroxide was added to the solution. The solid which separated after several hours was collected, boiled up with ethyl alcohol and the solution filtered hot. Upon cooling an orange powder separated. Similarly other p-dialkylaminocinnamal acetones can be prepared.

*Example 22.—Bis-(p-dimethylaminobenzalacetone)*

7.45 g. of p-dimethylaminobenzaldehyde, 1.45 g. of acetone and 50 cc. of ethyl alcohol were heated to give a solution. 10 cc. of 10 per cent (by weight) of aqueous sodium hydroxide were added to the solution and the resulting mixture was allowed to stand for 48 hours. An orange powder separated which was recrystallized from ethyl alcohol, forming glistening orange plates melting at 195° to 196° C. Similarly other bis-(p-dialkylaminobenzalacetones) can be prepared, as can bis-(p-dialkylaminocinnamal acetones).

The hydrazones, semicarbazones, oximes and aminoguanides of the carbonylic compounds can be prepared by refluxing the carbonylic compounds with a hydrazine salt, a semi-carbazide salt, a hydroxylamine salt or an aminoguanidine salt, in ethyl alcohol, in the presence of sodium acetate. The longer chain carbonylic compounds can be prepared as described by Konig, Ber. 61, 2078 (1928).

What I claim as my invention and desire to be secured by Letters Patent of the United States is:

1. A photographic silver halide emulsion sensitized with at least one sensitizing dye selected from the group consisting of 2'-cyanine salts and oxacarbocyanine salts and containing, as a supersensitizer, at least one compound selected from those which are represented by the following general formula:

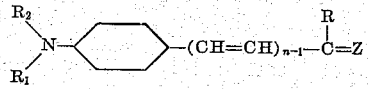

wherein $R_1$ and $R_2$ each represents an alkyl group, $n$ represents a positive integer of from 1 to 6, R represents a member selected from the group consisting of hydrogen, an alkyl group, an aralkyl group, an aryl group and a group of the following general formula:

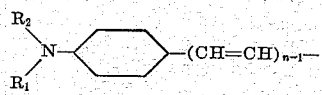

wherein $R_1$, $R_2$ and $n$ each represents the values given above; Z represents a member selected from the group consisting of a hydrazono group, an alkylhydrazono group, a dialkylhydrazono group, an aralkylhydrazono group, a diaralkylhydrazono group, an arylhydrazono group, a diarylhydrazono group, a hydroximino group, a carbamylhydrazono group, a thiocarbamylhydrazono group and a guanylhydrazono group when $n$ represents a positive integer of from 1 to 6, and when $n$ represents a positive integer of from 2 to 6, Z represents an oxygen atom in addition to the groups recited above for Z.

2. A photographic gelatino-silver-halide emulsion sensitized with at least one sensitizing dye selected from the group consisting of 2'-cyanine salts and oxacarbocyanine salts and containing, as a supersensitizer, at least one compound selected from those which are represented by the following general formula:

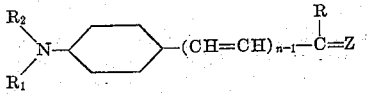

wherein $R_1$ and $R_2$ each represents an alkyl group, $n$ represents a positive integer of from 1 to 6, R represents a member selected from the group consisting of hydrogen, an alkyl group, an aralkyl group, an aryl group and a group of the following general formula:

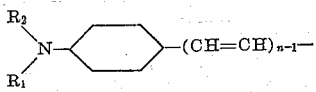

wherein $R_1$, $R_2$ and $n$ each represents the values given above, Z represents a member selected from the group consisting of a hydrazono group, an alkylhydrazono group, a dialkylhydrazono group, an aralkylhydrazono group, a diaralkylhydrazono group, an arylhydrazono group, a diarylhydrazono group, a hydroximino group, a carbamylhydrazono group, a thiocarbamylhydrazono group and a guanylhydrazono group when $n$ represents a positive integer of from 1 to 6, and when $n$ represents a positive integer of from 2 to 6, Z represents an oxygen atom in addition to the groups recited above for Z.

3. A photographic gelatino-silver-halide developing-out emulsion sensitized with at least one sensitizing dye selected from the group consisting of 2'-cyanine salts and oxacarbocyanine salts and containing, as a supersensitizer, at least one compound selected from those which are represented by the following general formula:

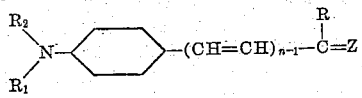

wherein $R_1$ and $R_2$ each represents an alkyl group, $n$ represents a positive integer of from 1 to 6, R represents a member selected from the group consisting of hydrogen, an alkyl group, an aralkyl group, an aryl group and a group of the following general formula:

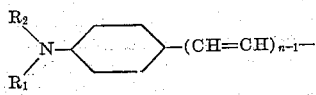

wherein $R_1$, $R_2$ and $n$ each represents the values given above, Z represents a member selected from the group consisting of a hydrazono group, an alkylhydrazono group, a dialkylhydrazono group, an aralkylhydrazono group, a diaralkylhydrazono group, an arylhydrazono group, a diarylhydrazono group, a hydroximino group, a carbamylhydrazono group, a thiocarbamylhydrazono group and a guanylhydrazono group when $n$ represents a positive integer of from 1 to 6, and when $n$ represents a positive integer of from 2 to 6, Z represents an oxygen atom in addition to the groups recited above for Z.

4. A photographic gelatino-silver-bromiodide developing-out emulsion sensitized with at least one sensitizing dye selected from the group consisting of 2'-cyanine salts and oxacarbocyanine salts and containing, as a supersensitizer, at least one compound selected from those which are represented by the following general formula:

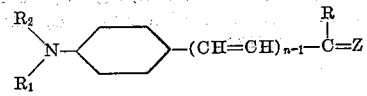

wherein $R_1$ and $R_2$ each represents an alkyl group, $n$ represents a positive integer of from 1 to 6, R represents a member selected from the group consisting of hydrogen, an alkyl group, an aralkyl group, an aryl group and a group of the following general formula:

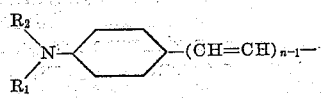

wherein $R_1$, $R_2$ and $n$ each represents the values given above, Z represents a member selected from the group consisting of a hydrazono group, an alkylhydrazono group, a dialkylhydrazono group, an aralkylhydrazono group, a diaralkylhydrazono group, an arylhydrazono group, a diarylhydrazono group, a hydroximino group, a carbamylhydrazono group, a thiocarbamylhydrazono group and a guanylhydrazono group when $n$ represents a positive integer of from 1 to 6, and when $n$ represents a positive integer of from 2 to 6, Z represents an oxygen atom in addition to the groups recited above for Z.

5. A photographic gelatino-silver-halide developing-out emulsion sensitized with at least one 2'-cyanine sensitizing dye and containing, as a supersensitizer, at least one compound selected from those which are represented by the following general formula:

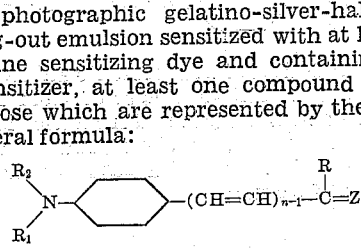

wherein $R_1$ and $R_2$ each represents an alkyl group, $n$ represents a positive integer of from 1 to 6, R represents a member selected from the group consisting of hydrogen, an alkyl group, an aralkyl group, an aryl group and a group of the following general formula:

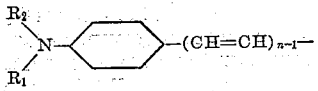

wherein $R_1$, $R_2$ and $n$ each represents the values given above, Z represents a member selected from the group consisting of a hydrazono group, an alkylhydrazono group, a dialkylhydrazono group, an aralkylhydrazono group, a diaralkylhydrazono group, an arylhydrazono group, a diarylhydrazono group, a hydroximino group, a carbamylhydrazono group, a thiacarbamylhydrazono group and a guanylhydrazono group when $n$ represents a positive integer of from 1 to 6, and when $n$ represents a positive integer of from 2 to 6, Z represents an oxygen atom in addition to the groups recited above for Z.

6. A photographic gelatino-silver-bromiodide developing-out emulsion sensitized with at least one 2'-cyanine sensitizing dye and containing, as a supersensitizer, at least one compound selected from those which are represented by the following general formula:

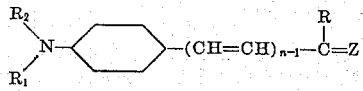

wherein $R_1$ and $R_2$ each represents an alkyl group, $n$ represents a positive integer of from 1 to 6, R represents a member selected from the group consisting of hydrogen, an alkyl group, an aralkyl group, an aryl group and a group of the following general formula:

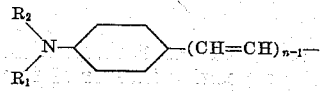

wherein $R_1$, $R_2$ and $n$ each represents the values given above, Z represents a member selected from the group consisting of a hydrazono group, an alkylhydrazono group, a dialkylhydrazono group, an aralkylhydrazono group, a diaralkylhydrazono group, an arylhydrazono group, a diarylhydrazono group, a hydroximino group, a carbamylhydrazono group, a thiocarbamylhydrazono group and a guanylhydrazono group when $n$ represents a positive integer of from 1 to 6, and when $n$ represents a positive integer of from 2 to 6, Z represents an oxygen atom in addition to the groups recited above for Z.

7. A photographic gelatino-silver-bromiodide developing-out emulsion sensitized with at least one 1,1'-dialkyl-2,2'-cyanine salt and containing, as a supersensitizer, at least one compound selected from those which are represented by the following general formula:

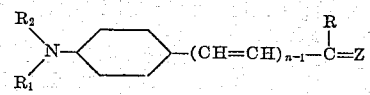

wherein $R_1$ and $R_2$ each represents an alkyl group, $n$ represents a positive integer of from 1 to 6, R represents a member selected from the group consisting of hydrogen, an alkyl group, an aralkyl group, an aryl group and a group of the following general formula:

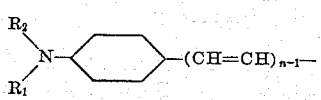

wherein $R_1$, $R_2$ and $n$ each represents the values given above, Z represents a member selected from the group consisting of a hydrazono group, an alkylhydrazono group, a dialkylhydrazono group, an aralkylhydrazono group, a diaralkylhydrazono group, an arylhydrazono group, a diarylhydrazono group, a hydroximino group, a carbamylhydrazono group, a thiocarbamylhydrazono group and a guanylhydrazono group when $n$ represents a positive integer of from 1 to 6, and when $n$ represents a positive integer of from 2 to 6, Z represents an oxygen atom in addition to the groups recited above for Z.

8. A photographic gelatino-silver-bromiodide developing-out emulsion sensitized with at least one 1,1'-dialkyl-2,2'-cyanine salt and containing, as a supersensitizer, at least one of the ketones which are represented by the following general formula:

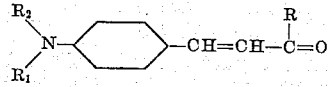

wherein $R_1$ and $R_2$ each represents an alkyl group and R represents a member selected from the group consisting of an alkyl group, an aralkyl group, and an aryl group.

9. A photographic gelatino-silver-bromiodide developing-out emulsion sensitized with at least one 1,1'-dialkyl-2,2'-cyanine salt in which the alkyl groups each contain from 1 to 2 carbon atoms, the emulsion containing as a supersensitizer at least one of the ketones which are represented by the following general formula:

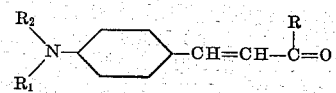

wherein $R_1$ and $R_2$ each represents an alkyl group and R represents a member selected from the group consisting of an alkyl group, an aralkyl group, and an aryl group.

10. A photographic gelatino-silver-bromiodide developing-out emulsion sensitized with at least one 1,1'-dialkyl-2,2'-cyanine salt in which the alkyl groups each contain from 1 to 2 carbon atoms, the emulsion containing, as a supersensitizer, at least one of the compounds which are represented by the following general formula:

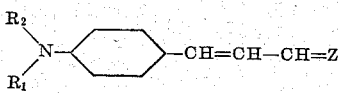

wherein $R_1$ and $R_2$ each represents an alkyl group, Z represents a member selected from the group consisting of an oxygen atom, a hydrazono group, an alkylhydrazono group, a dialkylhydrazono group, an aralkylhydrazono group, a diaralkylhydrazono group, an arylhydrazono group, a diarylhydrazono group, a hydroximino group, a carbamylhydrazono group, a thiocarbamylhydrazono group and a guanylhydrazono group.

11. A photographic gelatino-silver-bromiodide developing-out emulsion sensitized with at least one 1,1'-dialkyl-2,2'-cyanine salt in which the alkyl groups each contain from 1 to 2 carbon atoms, the emulsion containing, as a supersensitizer, at least one of the compounds which are represented by the following formula:

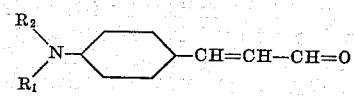

wherein $R_1$ and $R_2$ each represents an alkyl group.

12. A photographic gelatino-silver-bromiodide developing-out emulsion sensitized with at least one 1,1'-dialkyl-2,2'-cyanine salt in which the alkyl groups each contains from 1 to 2 carbon atoms, the emulsion containing, as a supersensitizer, p-dimethylaminocinnamic aldehyde semicarbazone.

13. A photographic gelatino-silver-bromiodide developing-out emulsion sensitized with at least one 1,1'-dialkyl-2,2'-cyanine salt in which the alkyl groups each contain from 1 to 2 carbon atoms, the emulsion containing, as a supersensitizer, p-dimethylaminocinnamalacetophenone.

14. A photographic gelatino-silver-bromiodide developing-out emulsion sensitized with at least one 1,1'-dialkyl-2,2'-cyanine salt in which the alkyl groups each contain from 1 to 2 carbon atoms, the emulsion containing, as a supersensitizer, p-dimethylaminocinnamic aldehyde.

15. A photographic gelatino-silver-bromiodide developing-out emulsion sensitized with at least one 1,1'-dialkyl-2,2'-cyanine salt in which the alkyl group contains from 1 to 2 carbon atoms, the emulsion containing, as a supersensitizer, at least one of the compounds which are represented by the following general formula:

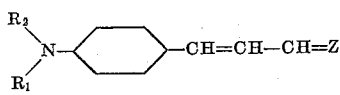

wherein $R_1$ and $R_2$ each represents an alkyl group, and Z represents the carbamylhydrazono group.

16. A photographic gelatino-silver-bromiodide developing-out emulsion sensitized with 1,1'-diethyl-2,2'-cyanine iodide, the emulsion containing, as a supersensitizer, p-dimethyl-aminocinnamalacetophenone.

17. A photographic gelatino-silver-bromiodide developing-out emulsion sensitized with 1,1-diethyl-2,2'-cyanine iodide, the emulsion containing, as a supersensitizer, p-dimethyl-aminocinnamic aldehyde.

18. A photographic gelatino-silver-bromiodide developing-out emulsion sensitized with 1,1'-diethyl-2,2'-cyanine iodide, the emulsion containing, as a supersensitizer, p-dimethylaminocinnamic aldehyde semicarbazone.

EDWARD B. KNOTT.

REFERENCES CITED

The following references are of record in the file of this patent:

UNITED STATES PATENTS

| Number | Name | Date |
|---|---|---|
| 2,313,922 | Carroll et al. | Mar. 16, 1943 |
| 2,316,268 | Mareis | Apr. 13, 1943 |